United States Patent
Sheth et al.

(10) Patent No.: US 10,492,352 B1
(45) Date of Patent: Dec. 3, 2019

(54) SHOVEL SYSTEM

(71) Applicants: Chintan Sheth, Hicksville, NY (US); Joseph Tricarico, Islip Terrace, NY (US)

(72) Inventors: Chintan Sheth, Hicksville, NY (US); Joseph Tricarico, Islip Terrace, NY (US)

( * ) Notice: Subject to any disclaimer, the term of this patent is extended or adjusted under 35 U.S.C. 154(b) by 0 days.

(21) Appl. No.: 15/914,593

(22) Filed: Mar. 7, 2018

Related U.S. Application Data

(60) Provisional application No. 62/469,783, filed on Mar. 10, 2017.

(51) Int. Cl.
| | |
|---|---|
| *A01B 1/22* | (2006.01) |
| *A01B 1/02* | (2006.01) |
| *A01B 1/20* | (2006.01) |
| *E01H 5/02* | (2006.01) |

(52) U.S. Cl.
CPC .............. *A01B 1/222* (2013.01); *A01B 1/02* (2013.01); *A01B 1/20* (2013.01); *E01H 5/02* (2013.01)

(58) Field of Classification Search
CPC .. A01B 1/02; A01B 1/022; A01B 1/20; A01B 1/222; E01H 5/02; B25G 3/38
USPC .......... 294/51, 53.5, 54.5; 37/241, 265, 273, 37/278, 285
See application file for complete search history.

(56) References Cited

U.S. PATENT DOCUMENTS

| | | | | | |
|---|---|---|---|---|---|
| 1,049,812 | A | * | 1/1913 | Darling | E01H 5/02 294/51 |
| 2,098,609 | A | * | 11/1937 | Bishop | B25G 3/38 294/51 |
| 2,239,297 | A | * | 4/1941 | Allen | E01H 5/02 294/51 |
| 2,552,016 | A | * | 5/1951 | Rose | A01D 7/04 37/241 |
| 3,994,081 | A | * | 11/1976 | Middleton | E01H 5/04 37/273 |
| 4,103,954 | A | * | 8/1978 | Vaslas | A01B 1/22 294/54.5 |
| 6,269,558 | B1 | * | 8/2001 | Alexander | E01H 5/02 294/54.5 |
| 8,800,175 | B1 | * | 8/2014 | Faraci | E01H 5/02 294/54.5 |
| 2007/0028487 | A1 | * | 2/2007 | Larson | E01H 5/02 37/278 |
| 2009/0013564 | A1 | * | 1/2009 | Mallaridas | E01H 5/02 37/273 |
| 2015/0233069 | A1 | * | 8/2015 | Fernandez, Sr. | E01H 5/061 37/241 |

* cited by examiner

*Primary Examiner* — Dean J Kramer

(57) ABSTRACT

A pole has an upper end and a lower end. A blade has a forward surface, a rearward surface, a central section, a left side section, and a right side section. Hinges couple the left side section and the right side section to the central section respectively. A converting assembly facilitates movement of the pole and conversion of the blade between a first orientation for digging/lifting and a second orientation for snow pushing. housing is secured to and extends rearwardly from the central section. A pivot pin couples the lower end of the pole to the housing. A block is slidably received within the housing. A left linkage assembly couples the left side of the blade to the block. A right linkage assembly couples the right side section of the blade to the block.

4 Claims, 3 Drawing Sheets

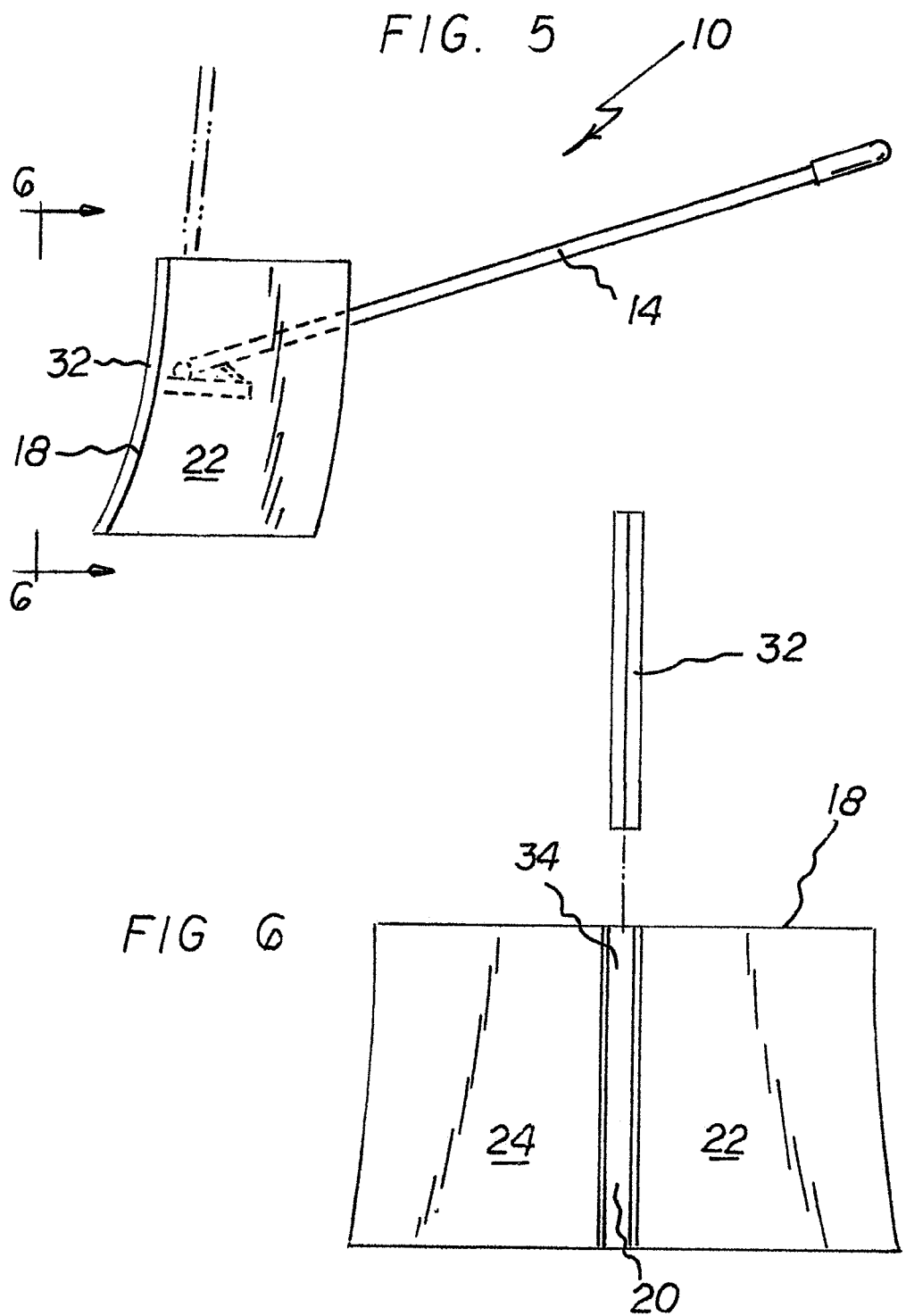

SHOVEL SYSTEM

RELATED APPLICATION

This non-provisional application is based upon and claims the benefit of Provisional Application No. 62/469,783 filed Mar. 10, 2017, the subject matter of which is incorporated herein by reference.

BACKGROUND OF THE INVENTION

Field of the Invention

The present invention relates to a shovel system and more particularly pertains to converting between a first orientation and a second orientation, the first orientation being for digging/lifting, the second orientation being for snow pushing, the converting and the digging/lifting and the snow pushing being done in a safe, convenient, and economical manner.

Description of the Prior Art

The use of shovel systems of known designs and configurations is known in the prior art. More specifically, shovel systems of known designs and configurations previously devised and utilized for the purpose of digging and lifting and snow pushing are known to consist basically of familiar, expected, and obvious structural configurations, notwithstanding the myriad of designs encompassed by the crowded prior art which has been developed for the fulfillment of countless objectives and requirements.

While these devices fulfill their respective, particular objectives and requirements, they do not describe a shovel system that converts between a first orientation for digging/lifting and a second orientation for snow pushing. The converting and the digging/lifting and the snow pushing are done in a safe, convenient, and economical manner.

In this respect, the shovel system according to the present invention substantially departs from the conventional concepts and designs of the prior art, and in doing so provides an apparatus primarily developed for the purpose of converting between a first orientation for digging/lifting and a second orientation for snow pushing. The converting and the digging/lifting and the snow pushing are done in a safe, convenient, and economical manner.

Therefore, it can be appreciated that there exists a continuing need for a new and improved shovel system which can be converted between a first orientation for digging/lifting and a second orientation for snow pushing. The converting and the digging/lifting and the snow pushing are done in a safe, convenient, and economical manner. In this regard, the present invention substantially fulfills this need.

SUMMARY OF THE INVENTION

In view of the disadvantages inherent in the known types of shovel systems of known designs and configurations now present in the prior art, the present invention provides an improved shovel system. As such, the general purpose of the present invention, which will be described subsequently in greater detail, is converting a shovel between a first orientation and a second orientation, the first orientation being for digging/lifting, the second orientation being for snow pushing. The converting and the digging/lifting and the snow pushing are done in a safe, convenient, and economical manner.

To attain this, from a broad viewpoint, the present invention is a shovel system. A pole has an upper end and a lower end. A blade has a forward surface and a rearward surface. The blade has a central section, a left side section, and a right side section. Hinges couple the left side section to the central section. Hinges couple the right side section to the central section. A converting assembly is provided. In this manner, movement of the pole is facilitated and the blade is converted between a first orientation and a second orientation. The first orientation facilitates digging/lifting. The second orientation facilitates snow pushing. A housing is secured to and extends rearwardly from the central section. A pivot pin couples the lower end of the pole to the housing. A block is slidably received within the housing. A left linkage assembly couples the left side of the blade to the block. A right linkage assembly couples the right side section of the blade to the block.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the invention be regarded as including such equivalent constructions insofar as they do not depart from the spirit and scope of the present invention.

It is therefore an object of the present invention to provide a new and improved shovel system which has all of the advantages of the prior art shovel systems of known designs and configurations and none of the disadvantages.

It is another object of the present invention to provide a new and improved shovel system which may be easily and efficiently manufactured and marketed.

It is a further object of the present invention to provide a new and improved shovel system which is of durable and reliable constructions.

An even further object of the present invention is to provide a new and improved shovel system which is susceptible of a low cost of manufacture with regard to both materials and labor, and which accordingly is then susceptible of low prices of sale to the consuming public, thereby making such shovel system economically available to the buying public.

Lastly, it is an object of the present invention to provide a shovel system for converting between a first orientation for digging/lifting and a second orientation for snow pushing. The converting and the digging/lifting and the snow pushing are done in a safe, convenient, and economical manner.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a side elevational view similar to FIG. 1 but with the shovel system being in the snow pushing orientation.

FIG. 6 is an exploded front elevational view of the shovel system in the snow pushing orientation.

The same reference numerals refer to the same parts throughout the various Figures.

DESCRIPTION OF THE PREFERRED EMBODIMENT

Figure 1:
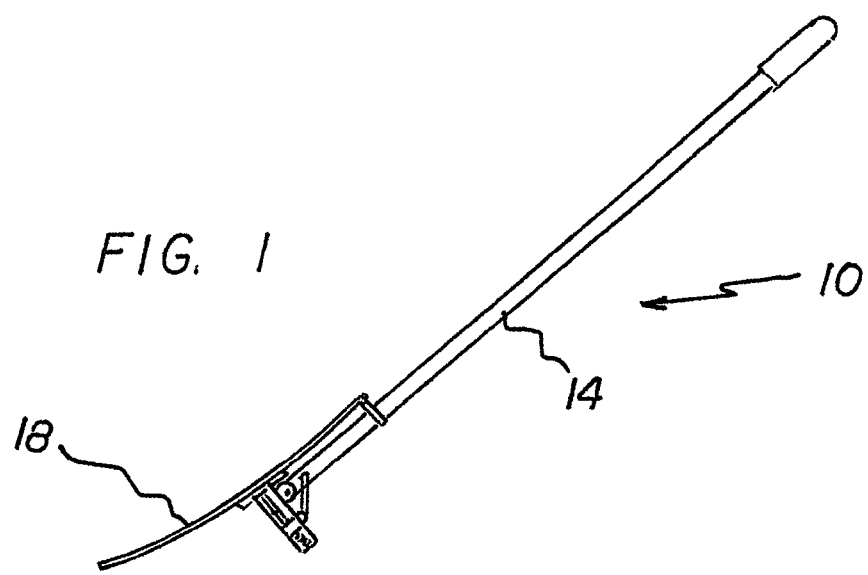
FIG. 1 is a side elevational view of a shovel system constructed in accordance with the principles of the present invention, the shovel system being in the digging/lifting orientation.
Figure 2:
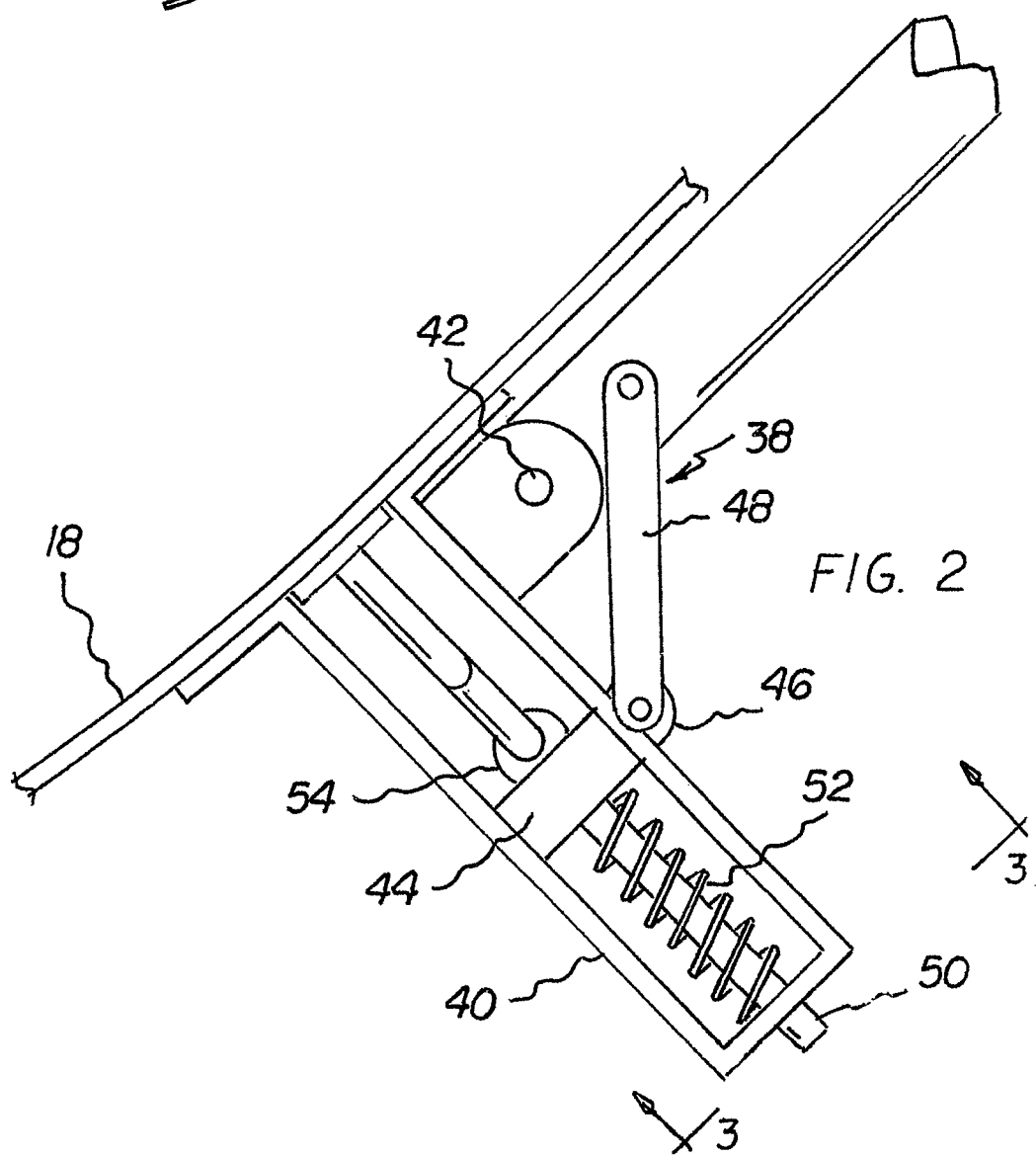
FIG. 2 is an enlarged side elevational view of the interface region between the pole and the blade of FIG. 1.
Figure 3:
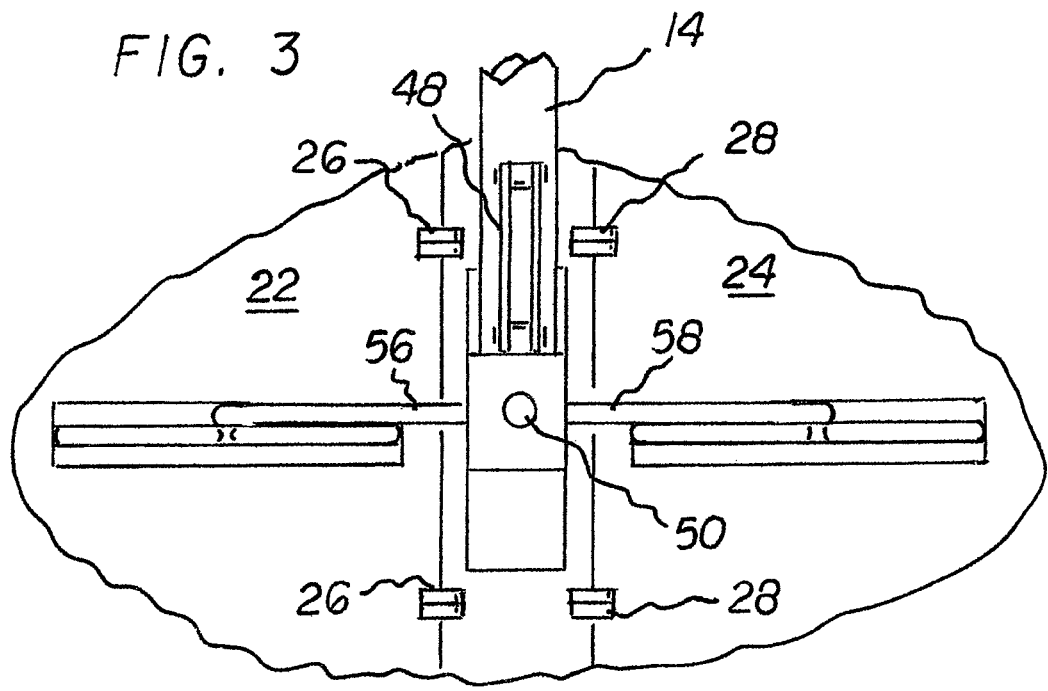
FIG. 3 is a rear elevational view of the housing and linkage assembly shown in FIGS. 1 and 2.
Figure 4:
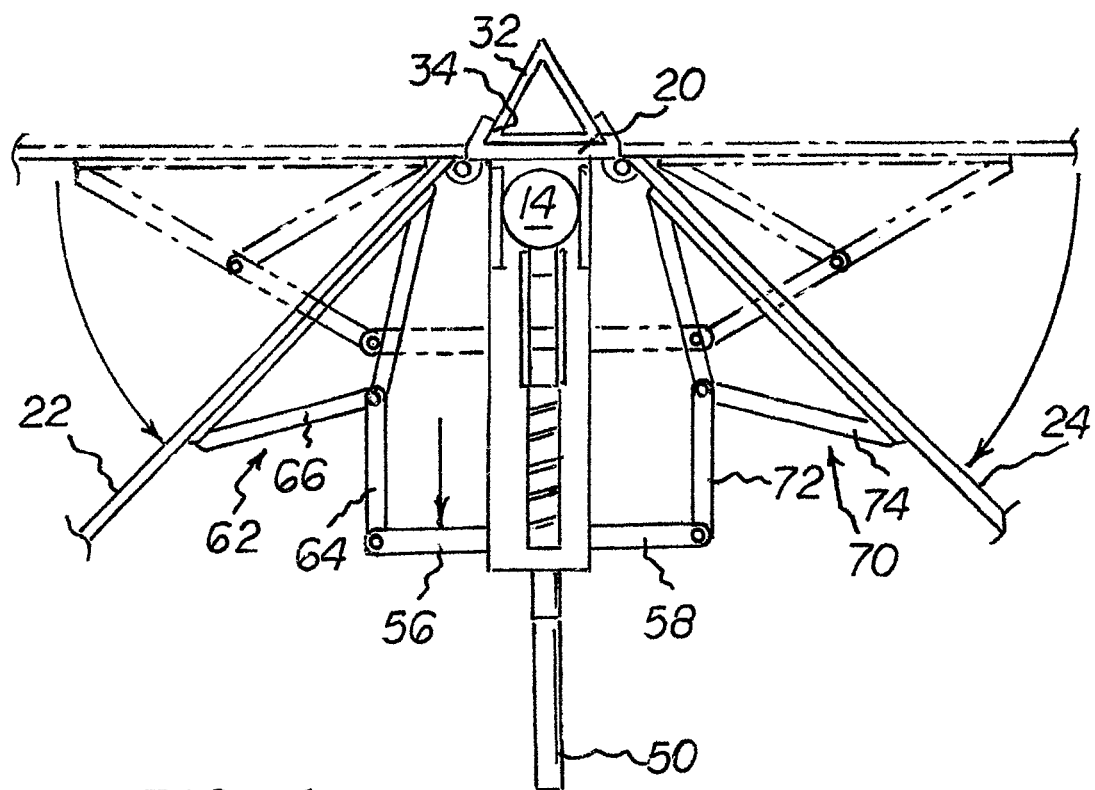
FIG. 4 is a plan view of the system illustrated in the prior figures, the shovel system being in the snow pushing orientation.

With reference now to the drawings, and in particular to FIG. 1 thereof, the preferred embodiment of the shovel embodying the principles and concepts of the present invention and generally designated by the reference numeral 10 will be described.

The present invention, the shovel system 10 is comprised of a plurality of components. Such components are individually configured and correlated with respect to each other so as to attain the desired objective. In their broadest context, such include a pole, a blade, a converting assembly, a left linkage and a right linkage.

From a specific perspective, From a specific viewpoint, the present invention is shovel system. First provided is a pole 14. The pole is fabricated of a rigid material. The pole is linear in configuration. The pole has an upper end and a lower end.

A blade 18 is next provided. The blade is fabricated of a rigid material. The blade has a forward surface and a rearward surface. The blade has a central section 20, a left side section 22, and a right side section 24. The blade has left hinges 26 pivotably coupling the left side section to the central section. The blade has right hinges 28 pivotably coupling the right side section to the central section. The left side section and the right side section are coplanar when in a first orientation for digging/lifting. The left side section and the right side section are angled rearwardly when in a second orientation for snow pushing.

Next, a central pusher 32 is provided. The central pusher is fabricated of a rigid material. The central pusher is linear in configuration. The central pusher has a linear forward edge and a planar rearward surface. The front forward surface of the blade has a slot 34. The slot is adapted to removably receive the central pusher when in the second orientation.

A converting assembly 38 is next provided. The converting assembly facilitates movement of the pole to move the blade between the first orientation and the second orientation. The converting assembly includes a housing 40. The housing is secured to and extends rearwardly from the central section. The converting assembly includes a pivot pin 42. The pivot pin couples the lower end of the pole to the housing. The converting assembly includes a slider 44. The housing slidably receives the slider. The slider has an upwardly extending tab 46. The converting assembly has a converting link 48. The converting link pivotally couples the upwardly extending tab and the pole. The converting assembly includes a pin 50. The pin extends rearwardly from the slider. The converting assembly includes a coil spring 52. The coil spring is within the housing. The coil spring encompasses the pin. The coil spring urges the slider forwardly. The converting assembly includes a forwardly extending tab 54. The forwardly extending tab is secured to the slider. The converting assembly includes a left lateral tab 56. The left lateral tab is secured to the slider. The converting assembly includes a right lateral tab 58. The right lateral tab is secured to the slider.

Further provided is a left linkage assembly 62. The left linkage assembly includes a primary left link 64. The primary left link couples the left lateral tab and the left side section of the blade adjacent to the central section of the blade. The left linkage assembly includes a secondary left link 66. The second left link couples the primary left link at an intermediate extent of the primary left link to the left side section of the blade.

Provided last is a right linkage assembly 70. The right linkage assembly includes a primary right link 72. The primary right link couples the right lateral tab and the right side section of the blade. The right linkage assembly includes a secondary right link 74. The secondary right link couples the primary right link at an intermediate extent of the primary right link to the right side section of the blade.

It should be understood that this application, text, and figures, describe a preferred embodiment of the invention. the invention related to a system that may change configuration to allow for digging/lifting to pushing. The exact way that the shovel converts/changes from a digging/lifting orientation to a V-shaped pushing orientation may be achieved mechanically, pneumatically, hydraulically, or by actuator/motor. Further with reference to the figures, the angle of the blade with reference to the ground may be variable.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and

What is claimed as being new and desired to be protected by Letters Patent of the United States is as follows:

1. A shovel system comprising:
   a pole having an upper end and a lower end;
   a blade having a forward surface and a rearward surface, the blade having a central section and a left side section and a right side section;
   hinges coupling the left side section to the central section and the right side section to the central section;
   a converting assembly to facilitate movement of the pole for converting the blade between a first orientation for digging/lifting and a second orientation for snow pushing, a housing secured to and extending rearwardly from the central section, a pivot pin coupling the lower end of the pole to the housing, a slider slidably received within the housing, a pin extending rearwardly from the slider, a coil spring within the housing encompassing the pin and urging the slider forwardly, a left lateral tab secured to the slider, a right lateral tab secured to the slider;
   a left linkage assembly coupling the left side section of the blade to the slider; and
   a right linkage assembly coupling the right side section of the blade to the slider.

2. The system as set forth in claim 1 wherein:
   each linkage assembly includes a primary link coupling a lateral tab and an associated side section of the blade; and
   each linkage assembly includes a secondary left link coupling an associated primary link at an intermediate extent of an associated side section of the blade.

3. The system as set forth in claim 1 and further including:
   a central pusher formed in a linear configuration with a linear forward edge and a planar rearward surface, a slot formed in the forward surface of the blade adapted to removably receive the central pusher when in the second orientation.

4. A shovel system (10) for converting between a first orientation and a second orientation, the first orientation being for digging/lifting, the second orientation being for snow pushing, the system comprising, in combination:
   a pole (14) fabricated of a rigid material and formed in a linear configuration with an upper end and a lower end;
   a blade (18) fabricated of a rigid material, the blade having a forward surface and a rearward surface, the blade having a central section (20) and a left side section (22) and a right side section (24), left hinges (26) pivotably coupling the left side section to the central section, right hinges (28) pivotably coupling the right side section to the central section, the left side section and the right side section being coplanar when in a first orientation for digging/lifting, the left side section and the right side section being angled rearwardly when in a second orientation for snow pushing;
   a central pusher (32) fabricated of a rigid material, the central pusher being formed in a linear configuration with a linear forward edge and a planar rearward surface, a slot (34) formed in the forward surface of the blade adapted to removably receive the central pusher when in the second orientation;
   a converting assembly (38) to facilitate movement of the pole to move the blade between the first orientation and the second orientation, the converting assembly including a housing (40) secured to and extending rearwardly from the central section, a pivot pin (42) coupling the lower end of the pole to the housing, a slider (44) slidably received within the housing, the slider having an upwardly extending tab (46), a converting link (48) pivotally coupling the upwardly extending tab and the pole, a pin (50) extending rearwardly from the slider, a coil spring (52) within the housing encompassing the pin and urging the slider forwardly, a forwardly extending tab (54) secured to the slider, a left lateral tab (56) secured to the slider, a right lateral tab (58) secured to the slider;
   a left linkage assembly (62) including a primary left link (64) coupling the left lateral tab and the left side section of the blade adjacent to the central section of the blade, a secondary left link (66) coupling the primary left link at an intermediate extent of the primary left link to the left side section of the blade; and
   a right linkage assembly (70) including a primary right link (72) coupling the right lateral tab and the right side section of the blade, a secondary right link (74) coupling the primary right link at an intermediate extent of the primary right link to the right side section of the blade.

* * * * *